(12) United States Patent
Shoeb et al.

(10) Patent No.: US 12,518,515 B2
(45) Date of Patent: ***Jan. 6, 2026

(54) COMPRESSING A SCENE INTO A GENERATIVE NEURAL NETWORK FOR UAV SCENE ANALYSIS APPLICATIONS

(71) Applicant: WING Aviation LLC, Mountain View, CA (US)

(72) Inventors: Ali Shoeb, San Rafael, CA (US); Domitille Commun, Mountain View, CA (US)

(73) Assignee: Wing Aviation LLC, Palo Alto, CA (US)

( * ) Notice: Subject to any disclaimer, the term of this patent is extended or adjusted under 35 U.S.C. 154(b) by 253 days.

This patent is subject to a terminal disclaimer.

(21) Appl. No.: 18/229,512

(22) Filed: Aug. 2, 2023

(65) Prior Publication Data

US 2025/0046064 A1    Feb. 6, 2025

(51) Int. Cl.
*G06T 9/00*   (2006.01)
*G06T 7/579*   (2017.01)
(Continued)

(52) U.S. Cl.
CPC ............ *G06V 10/774* (2022.01); *G06T 7/579* (2017.01); *G06T 7/593* (2017.01); *G06T 9/002* (2013.01);
(Continued)

(58) Field of Classification Search
None
See application file for complete search history.

(56) References Cited

U.S. PATENT DOCUMENTS 12,322,068 B1 * 6/2025 Kim .......................... G06T 5/60
2015/0301180 A1 * 10/2015 Stettner ................. G01S 7/4863
257/448

(Continued)

OTHER PUBLICATIONS

Tancik et al., "Fourier Features Let Networks Learn High Frequency Functions in Low Dimensional Domains," arXiv:2006.10739v1 [cs.CV] Jun. 18, 2020, 24 pages.

(Continued)

*Primary Examiner* — Peter D Nolan
*Assistant Examiner* — Jacob Kent Besteman-Street
(74) *Attorney, Agent, or Firm* — Christensen O'Connor Johnson Kindness PLLC

(57) ABSTRACT

A technique performed by UAV delivery system includes: arriving by a UAV of over a destination area; capturing a plurality of aerial images of a scene at the destination area with an onboard camera system of the UAV while flying above the destination area, wherein the aerial images capture the scene from a plurality of UAV vantage points offset from each other; optimizing weights of a generative neural network (GNN) using at least some of the aerial images as a training dataset to encode a volumetric representation of the scene into the GNN, wherein the weights are optimized by an onboard processing system of the UAV; and communicating the GNN with the weights optimized to a backend datacenter in communication with the UAV to transmit the volumetric representation of the scene over which the UAV flew without transmitting the aerial images themselves to the backend datacenter.

24 Claims, 7 Drawing Sheets

(51) Int. Cl.
| | |
|---|---|
| *G06T 7/593* | (2017.01) |
| *G06T 15/20* | (2011.01) |
| *G06V 10/774* | (2022.01) |
| *G06V 10/82* | (2022.01) |
| *G06V 20/17* | (2022.01) |
| *B64U 10/20* | (2023.01) |
| *B64U 101/30* | (2023.01) |
| *B64U 101/60* | (2023.01) |

(52) U.S. Cl.
CPC ............. *G06T 15/20* (2013.01); *G06V 10/82* (2022.01); *G06V 20/17* (2022.01); *B64U 10/20* (2023.01); *B64U 2101/30* (2023.01); *B64U 2101/60* (2023.01); *G06T 2207/10012* (2013.01); *G06T 2207/10032* (2013.01); *G06T 2207/20081* (2013.01); *G06T 2207/20084* (2013.01)

(56) References Cited

U.S. PATENT DOCUMENTS

| | | | | |
|---|---|---|---|---|
| 2022/0147776 | A1* | 5/2022 | Yang | G06V 10/82 |
| 2022/0399936 | A1* | 12/2022 | Arksey | G05D 1/695 |
| 2024/0273802 | A1* | 8/2024 | Wang | G06T 17/00 |
| 2024/0411316 | A1* | 12/2024 | Miao | G06T 7/73 |
| 2025/0130581 | A1* | 4/2025 | Abeywardena | G06Q 10/083 |

OTHER PUBLICATIONS

Chenxi Lola Deng et al. "Compressing Explicit Voxel Grid Representations: fast NeRFs become also small," LTCI, Telecom Paris, Institut Polytechnique de Paris, arXiv:2210.12782v1 [cs.CV] Oct. 23, 2022, 18 pages.

Dipam Patel et al., "DroNeRF: Real-time Multi-agent Drone Pose Optimization for Computing Neural Radiance Fields," Department of Computer Science, Purdue University, USA, arXiv 2303.04322v1 [cs.RO] Mar. 8, 2023, 8 pages.

Kangle Deng et al. "Depth-supervised NeRF: Fewer Views and Faster Training for Free," arXiv:2107.02791v2 [cs.CV] Apr. 29, 2022, 13 pages.

Wikipedia, The Free Encyclopedia, "Multilayer perceptron", Retrieved from https://en.wikipedia.org/w/index.php?title=Multilayer_perceptron&oldid=1159593212 on Jun. 18, 2023, 6 pages.

Ben Mildenhall et al., "NeRF: Representing Scenes as Neural Radiance Fields for View Synthesis," arXiv:2003.08934v2 [cs.CV] Aug. 3, 2020, 25 pages.

Martin Anderson, "NeRF: Training Drones in Neural Radiance Environments", Artificial Intelligence, Unite AI, updated on Dec. 9, 2022, 6 pages.

Haithem Turki et al. "Mega-NeRF: Scalable Construction of Large-Scale NeRFs for Virtual Fly-Throughs,", Carnegie Mellon University, paper received prior to Aug. 2, 2023, 14 pages.

Vincent Sitzmann et al., "Implicit Neural Representations with Periodic Activation Functions," Stanford University, arXiv:2006.09661v1 [cs.CV] Jun. 17, 2020, 35 pages.

Wikipedia, The Free Encyclopedia, "Structure from motion," Retrieved from "https://en.wikipedia.org/w/index.php?title=Structure_from_motion&oldid=1138747075" downloaded Jun. 18, 2023, 7 pages.

Haithem Turki et al.: "Mega-NeRF: Construction of Large-Scale NeRFs for Virtual Fly-Throughs", Dec. 20, 2021, XP091173194, 14 pages.

Zirui Wu et al.: "AsyncNeRF: Learning Large-scale Radiance Fields from Asynchronous RGB-D Sequences with Time-Pose Function", arXiv:2211.07459v1, Nov. 14, 2022, XP091369132, 10 pages.

Yuanbo Xiangli et al.: "BungeeNeRF: Progressive Neural Radiance Field for Extreme Multi-scale Scene Rendering", arxiv.org Dec. 10, 2021, XP091504648, 17 pages.

Anpei Chen et al.: "MVSNeRF: Fast Generalizable Radiance Field Reconstruction from Multi-View Stereo", arXiv:2103.15595v1, Mar. 29, 2021, XP081918931, 13 pages.

Shuo Chen et al.: "Bidirectional Optical Flow NeRF: High Accuracy and High Quality under Fewer Views", Proceedings of the AAAI Conference on Artificial Intelligence, vol. 37, No. 1, Jun. 26, 2023, pp. 359-368, XP093277113, ISSN: 2159-5399, DOI: 10.1609/aaai.v37i1.25109.

Zhiqin Chen et al.: "MobileNeRF: Exploiting the Polygon Rasterization Pipeline for Efficient Neural Field Rendering on Mobile Architectures", arXiv:2208.00277v5, May 30, 2023, XP091522558, 16 pages.

Jose Martinez-Carranza et al.: "An Overview of NeRF Methods for Aerial Robotics". In: "Machine Learning for Complex and Unmanned Systems", May 31, 2023, CRC Press, XP093276360, ISBN: 978-1-003-38561-5, pp. 236-258, DOI: 10.1201/9781003385615-13, Retrieved from the Internet: URL:https://www.researchgate.net/publication/387534053.

Kyle (Yilin) Gao et al.: "NeRF: Neural Radiance Field in 3D Vision, Introduction and Review", arXiv:2210.00379v4, May 10, 2023, XP093276399, 28 pages.

PCT International Search Report and Written Opinion mailed May 22, 2025, in corresponding International Application No. PCT/US2024/033865, 18 pages.

\* cited by examiner

COMPRESSING A SCENE INTO A GENERATIVE NEURAL NETWORK FOR UAV SCENE ANALYSIS APPLICATIONS

TECHNICAL FIELD

This disclosure relates generally to the compression of scenes into an artificial neural network for unmanned aerial vehicle applications.

BACKGROUND INFORMATION

An unmanned vehicle, which may also be referred to as an autonomous vehicle, is a vehicle capable of traveling without a physically present human operator. Various types of unmanned vehicles exist for various different environments. For instance, unmanned vehicles exist for operation in the air, on the ground, underwater, and in space. Unmanned vehicles also exist for hybrid operations in which multi-environment operation is possible. Unmanned vehicles may be provisioned to perform various different missions, including payload delivery, exploration/reconnaissance, imaging, public safety, surveillance, or otherwise. The mission definition will often dictate a type of specialized equipment and/or configuration of the unmanned vehicle.

Unmanned aerial vehicles (also referred to as drones) can be adapted for package delivery missions to provide an aerial delivery service. One type of unmanned aerial vehicle (UAV) is a vertical takeoff and landing (VTOL) UAV. VTOL UAVs are particularly well-suited for package delivery missions. The VTOL capability enables a UAV to takeoff and land within a small footprint thereby providing package pick-ups and deliveries almost anywhere. To safely deliver packages in a variety of environments (particularly environments of first impression or populated urban/suburban environments), the UAV should be capable of effectively identifying and avoiding ground-based obstacles. The ability to acquire and maintain accurate, detailed, and up-to-date models of the delivery destinations and surrounding environments can help facilitate safe and intelligent navigation at these delivery zones.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. Not all instances of an element are necessarily labeled so as not to clutter the drawings where appropriate. The drawings are not necessarily to scale, emphasis instead being placed upon illustrating the principles being described.

DETAILED DESCRIPTION

Figure 1:
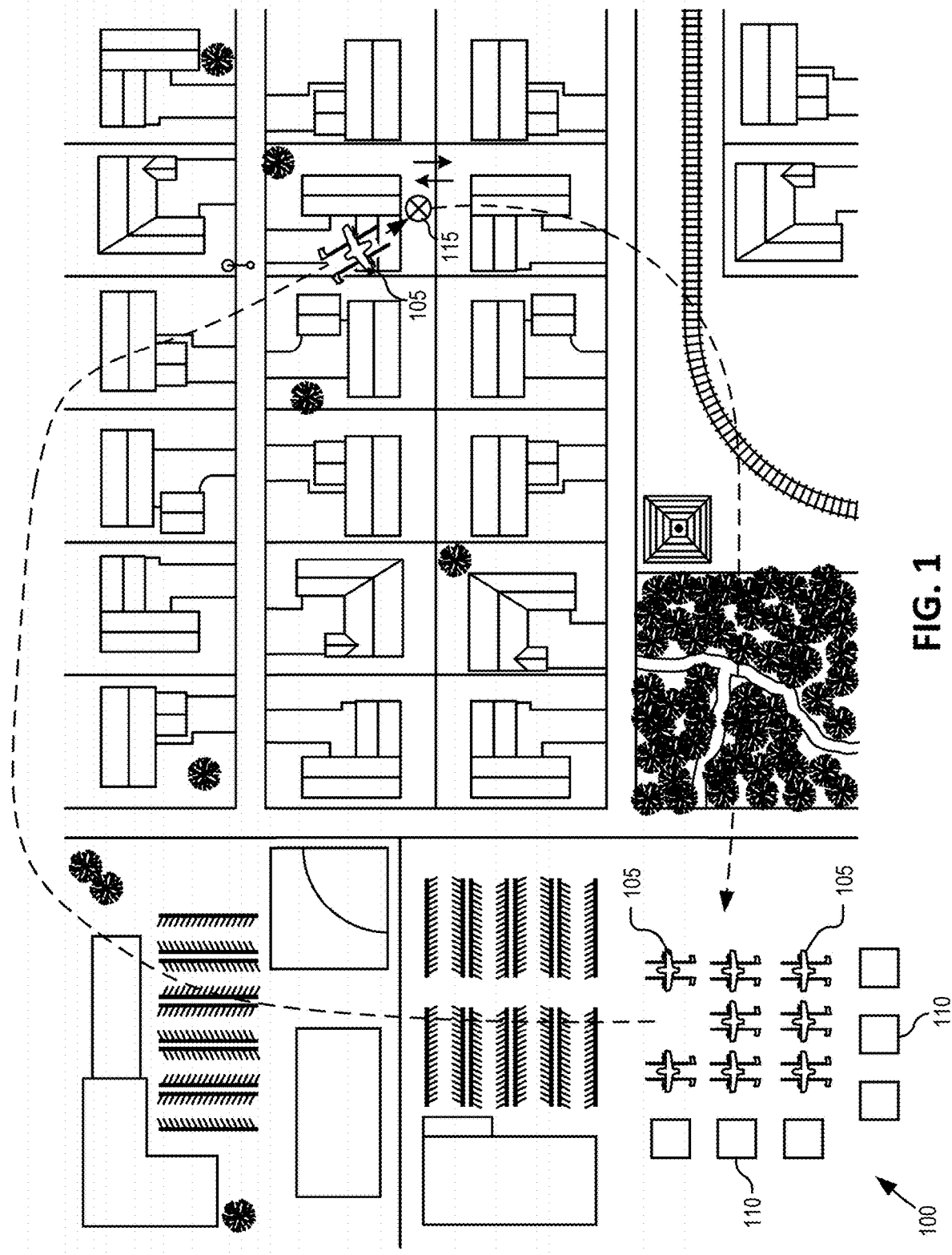
FIG. 1 illustrates operation of an unmanned aerial vehicle (UAV) delivery system that delivers packages into a neighborhood, in accordance with an embodiment of the disclosure.

Embodiments of a system, apparatus, and method of operation for compressing a scene into a neural network for efficient communication to a backend datacenter of an unmanned aerial vehicle (UAV) delivery system are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The ability to acquire and maintain accurate, detailed, and up-to-date models of the delivery destinations and surrounding environments can help facilitate safe and intelligent navigation at these delivery zones. In a UAV delivery system, it may be cost prohibitive to convey all of the aerial images needed to generate detailed models to safely navigate the various delivery zones encountered by UAVs during day-to-day operations. Not only can these aerial images help reconstruct three-dimensional (3D) models of various delivery zones throughout a neighborhood serviced by the UAV delivery system, but the aerial images can be valuable for analyzing a UAV's performance and training the various software models used throughout the UAV delivery system to improve automated decision making. In many instances, the quality and robustness of a machine learning (ML) model is directly correlated with the volume, quality, and variety of the dataset (e.g., images) used to train the ML model.

Embodiments disclosed herein describe a technique for efficiently compressing aerial images acquired by a UAV into a neural network, which can then be communicated to a backend datacenter of the UAV delivery system. In other words, the neural network can be trained to encode a volumetric representation of the scene captured by a sparse set of two-dimensional (2D) aerial images. Once communicated to the backend datacenter, the neural network may then be used to not only regenerate the originally captured aerial images, but also generate novel views of the scene from vantage points different than the vantage points of the originally captured aerial images. In this manner, the neural network may be referred to as a generative neural network (GNN) due to its ability to generate photorealistic novel views of the scene. The GNN may be implemented as a deep fully-connected neural network without any convolutional layers (often referred to as a multilayer perceptron or MLP). The GNN represents a highly efficient mechanism to capture and convey image data from the UAV to the backend datacenter. The backend datacenter may use the GNN to inform future delivery mission to the same destination, generate diverse, high quality (e.g., photorealistic) training data to train other ML models throughout the UAV delivery system, or even incorporate the GNN (or images output therefrom) into the mission data itself of a future delivery mission. The GNN (or images output therefrom) may effectuate improved localization, obstacle avoidance, and decision making at a given destination area.

Compression of the aerial images into the GNN may be accomplished via an optimization of the neural network weights (and biases), also referred to as training of the neural network. Once trained, the GNN encodes a volumetric representation of the scene captured by the aerial images used to train the GNN. These aerial images may be referred to as training data or ground truth data, which may also include additional metadata such as image depth information, position/motion/orientation information from the UAV, etc. In order to effectively train the neural network, the training data should include aerial images capturing the scene from a variety of different vantage points (e.g., two or more) offset from each other. These aerial images may be referred to as a sparse dataset since the aerial images include vantage point gaps and only capture the scene with a limited set of discontinuous (potentially nonoverlapping) images. The optimization of the weights themselves may be implemented with a variety of known techniques including neural radiance field (NeRF) optimization, depth-supervised (DS) NeRF optimization, sinusoidal representation network (SIREN) optimization, or otherwise. These and other features are described below.

FIG. 1 is a plan view illustration including a terminal area 100 for staging UAVs 105 that deliver packages into a neighborhood, in accordance with an embodiment of the disclosure. UAVs may one day routinely deliver small items into urban or suburban neighborhoods from small regional or neighborhood hubs such as terminal area 100 (also referred to as a local nest or staging area). Vendor facilities that wish to take advantage of the aerial delivery service may set up adjacent to terminal area 100 (such as vendor facilities 110) or be dispersed throughout the neighborhood for waypoint package pickups (not illustrated). An example aerial delivery mission may include a UAV 105 taking off from terminal area 100 with a package for delivery to a destination area 115 (e.g., delivery zone), rising to a cruise altitude, and cruising to the customer destination (e.g., destination area 115). At destination area 115, UAV 105 descends for package drop-off before once again ascending to a cruise altitude for the return journey back to terminal area 100.

While hovering over destination area 115, UAV 105 may capture a number of aerial images of the scene present at destination area 115 with its onboard camera system. These aerial images may be captured from a variety of different UAV vantage points offset from each other. For example, these aerial images may be captured while UAV 105 descends towards the ground to drop off a package as part of the delivery mission. UAV 105 may execute a spiral descent pattern (e.g., see FIG. 4 or 5) over destination area 115 to acquire a distributed spatial sampling of the scene. Contemporaneously with capturing the sparse set of aerial images, onboard sensors of UAV 105 may measure a motion, a position, and/or an orientation of UAV 105 while capturing each aerial image. Sensor metadata indicative of the motion, position, and/or orientation of UAV 105 is associated with the aerial images and saved to collectively form a training dataset. The training dataset is then cached onboard UAV 105 for the return trip back to staging area 100. While waiting at staging area 100 and charging for the next delivery mission, the otherwise idle processing resources of UAV 105 may be applied to compress the aerial images into a GNN by training the GNN to optimize its weights in a manner that efficiently encodes a volumetric representation of the scene at destination area 115. Of course, the onboard compute resources of UAV 105 may immediately commence the GNN optimization if spare resources and battery charge are available prior to returning to terminal area 100. After the GNN has been trained, the training data including the aerial images, may be deleted while the GNN with its optimized weights is communicated to a backend data center. This enables efficient transport of the volumetric representation of the scene to the backend data center without communicating the aerial images themselves, which occupy a much large data space.

Figure 2:
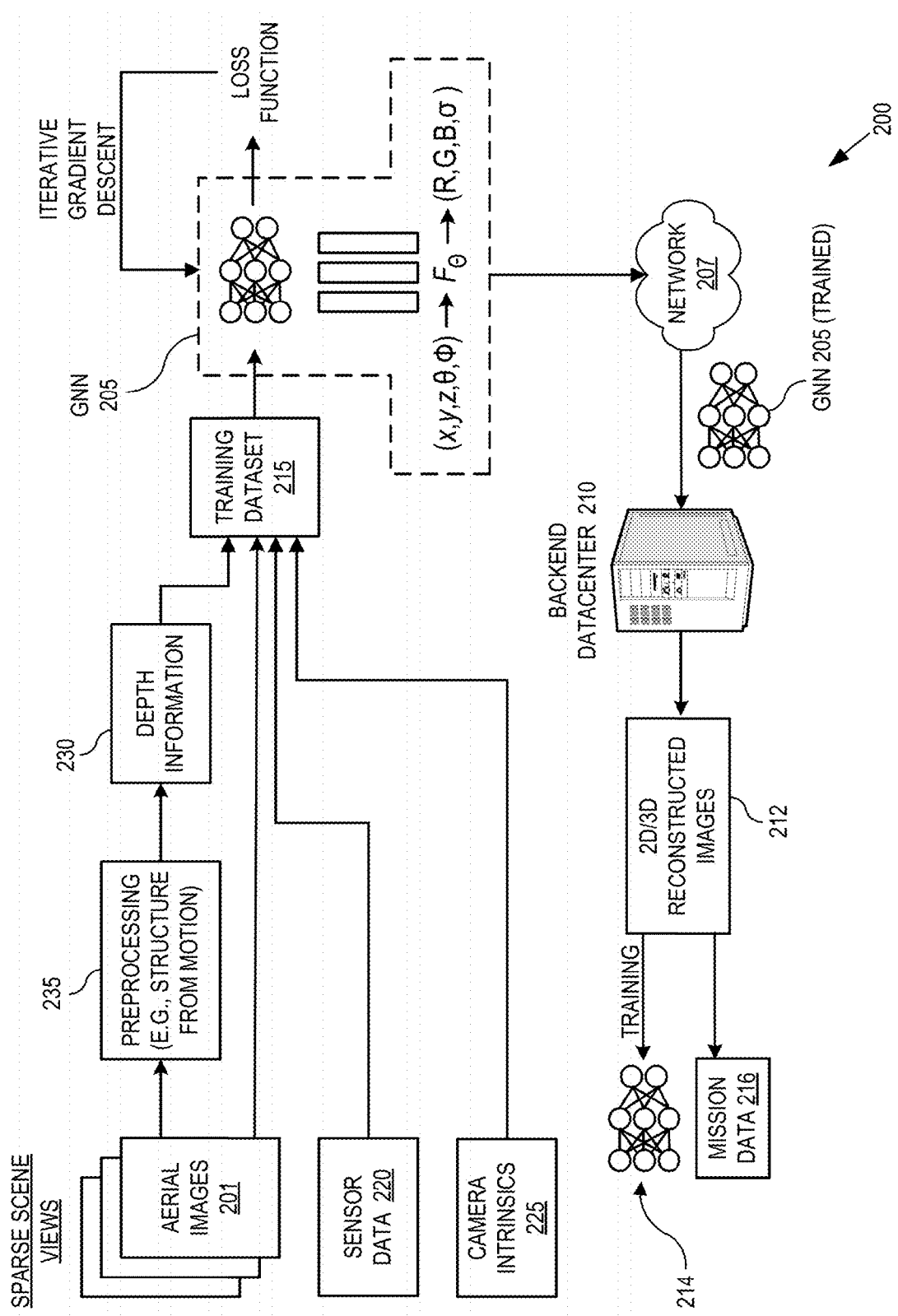
FIG. 2 is a dataflow diagram illustrating a processing pipeline for compressing aerial images of a scene into the weights of a neural network for efficient communication to a backend datacenter, in accordance with an embodiment of the disclosure.

FIG. 2 is a dataflow diagram illustrating a processing pipeline 200 for compressing aerial images 201 captured by UAV 115 of a scene at destination area 115 into the weights of a neural network 205 for efficient communication to a backend datacenter 210 of a UAV delivery system, in accordance with an embodiment of the disclosure. The UAV delivery system may include one or more of the following components: staging area 100, UAVs 115, backend datacenter 210, and any local control/communication systems that may reside at staging area 100 for bridging/interfacing between UAVs 115 and backend datacenter 210.

As mentioned above, neural network 205 may be referred to as GNN 205 due to its ability to generate novel views of a scene from novel vantage points once its weights have been optimized based upon training dataset 215. In other words, once trained, GNN 205 is queryable to generate these novel views. GNN 205 may be queryable for novel view synthesis and image-based rendering of 2D views and even synthesis of 3D models of the original static scene. GNN 205 may be trained on a sparse set of images capturing the static scene and then subsequently queried for novel view synthesis using a variety of techniques. In one embodiment, the training and view synthesis are performed using the neural radiance field (NeRF) techniques described in *NeRF: Representing Scenes as Neural Radiance Fields for View Synthesis* by Ben Mildenhall et al., arXiv: 2003.08934v2 [cs.CV], 3 Aug. 2020, the contents of which are incorporated herein by reference.

A NeRF represents a scene for subsequent view synthesis using an underlying continuous volumetric scene function $F_\theta$ trained on a sparse set of input views (e.g., aerial images 201). A NeRF implementation for GNN 205 may be a MLP network representation of Fe having a fully connected deep neural network. The input to GNN 205 may be a five-dimension (5D) coordinate (x, y, z, θ, φ) consisting of three positional coordinates (x, y, z) and two viewing directions (θ, φ) while the output is a volume density σ and a directional emitted color c, which may be represented as red (R), green (G), and blue (B) values. Thus, in one embodiment, GNN 205 is an MLP network Fe whose weights Θ map the 5D coordinates (x, y, z, θ, Φ) to (c, σ), which can then be integrated along viewing directions to recreate novel views of the scene. The 5D neural radiance field represents the scene at destination area 115 as the volume density and directional emitted radiance at any point in space. The loss function used to train weights Θ may be constructed using a summed difference between the ground truth aerial images 201 and the corresponding scene views reconstructed by $F_Θ$. An iterative gradient descent is performed using the training dataset 215 to minimize a loss value output from the loss function thereby compressing aerial images 201 into the weights Θ of GNN 205.

Training dataset 215 not only includes the sparse set of aerial images 201, but may also include sensor data 220 acquired from onboard sensor(s) of UAV 105, camera intrinsics 225, and in some embodiments depth information 230 generated from preprocessing 235 of aerial images 201. Sensor data 220 may include sensor metadata indicative of a motion, a position, and/or an orientation of UAV 105 when capturing each aerial image 201. This sensor metadata may be captured using an inertial measurement unit (IMU), a global navigation satellite system (GNSS) sensor, or other onboard sensors. An example IMU includes a magnetometer, an accelerometer, and/or a gyroscope. The camera intrinsics 225 includes characteristics of the onboard camera system of UAV 105 used when capturing aerial images 201. Such characteristics may include focal distance, zoom, shutter speed, exposure, etc. Depth information 230 represents image depths of pixels within aerial images 201. The image depths correspond to estimates of the separation distance between the onboard camera system and the real-world scene corresponding to each pixel in aerial images 201. Preprocessing 235 may implement a structure from motion technique to extract depth information 230 from aerial images 201. Preprocessing 235 may include optical flow analysis whereby movement of pixels between sequential video images are analyzed to estimate depth information. In an embodiment where the onboard camera system is a stereovision camera system, the preprocessing may include extracting stereo depth information due to parallax between the stereo images. Thus, preprocessing 235 may include one or more techniques that analyze aerial images 201 to generate depth estimates between UAV 105 and the various portions of the scene to generate depth information 230.

In yet another embodiment, GNN 205 may be trained based upon a depth-supervised (DS) optimization of its weights, such as the DS-NeRF optimization described in *Depth-supervised NeRf: Fewer and Faster Training for Free* by Kangle Deng et al., arXiv: 2107.02791v2 [cs.CV], 29 Apr. 2022, the contents of which are hereby incorporated by reference. The DS optimization uses additional depth information extracted either from aerial images 201 themselves via preprocessing 235, sensor data 220 acquired by the onboard sensors, and/or camera intrinsics 225 obtained from the onboard camera system. This depth information provides extra ground truth data for training GNN 205, which in turn expedites such training based upon fewer aerial images 201. In other words, the depth information expedites convergence of the loss function during the iterative gradient descents. Not only does this mean a sparser training dataset of aerial images 201 may be acquired and buffered for training GNN 205, but the weights and biases of GNN 205 may be trained to encode the volumetric representation of the scene with fewer iterative gradients descents, thereby saving processing resources (e.g., time, power, processing cycles, etc.).

Depth information 230 extracted during preprocessing 235 from aerial images 201 may include depth information from a variety of techniques. Depth information 230 includes estimated distances between the onboard camera system and the different objects, pixels, or portions within each aerial image 201. In one embodiment, depth information 230 may be stereo depth information (e.g., due to parallax between binocular images) when aerial images 201 include stereo images acquired from a stereovision camera system. The stereo depth information may be extracted from binocular images, or received as an output from the stereovision camera system itself.

In yet another embodiment, aerial images 201 may include sequential video frames acquired at a frame rate (e.g., 5, 10, 20, or 30 fps) sufficiently fast to facilitate optical flow analysis, from which depth information may be extracted. Optical flow is the pattern of motion of image pixels representing objects, surfaces, edges, etc. in a visual scene due to relative motion between the observer (e.g., the onboard camera system) and a scene (e.g., ground area below UAV 105). Optical flow is the distribution of apparent velocities, or flow velocities, of the image pixels between consecutive image frames in a video stream (e.g., sequence of image frames). Objects in the image, or image pixels, that appear to move more quickly are estimated to be closer or have a shallower image depth than image pixels that move more slowly. The divergence of these flow velocities can be used to compute a "focus of expansion," which indicates a direction of heading for UAV 105, a gradient in flow velocities across an object can be used to estimate its height, and the absolute flow velocity of an image pixel can be used to estimate its image depth in the scene (i.e., distance between object and camera). Accordingly, an onboard camera system of UAV 105 that is oriented to look down at the ground below the UAV can be leveraged to estimate distances to objects captured in aerial images 201 and store this as depth information for DS optimization of GNN 205. Optical flow depth estimates are calculated from flow velocities due to lateral motions while flow velocities due to rotational motions should be ignored. Accordingly, the onboard IMU sensor can be used to measure rotational motions of UAV 105 and compensate for those rotational motions when capturing a sequence of aerial images.

Figure 3A:
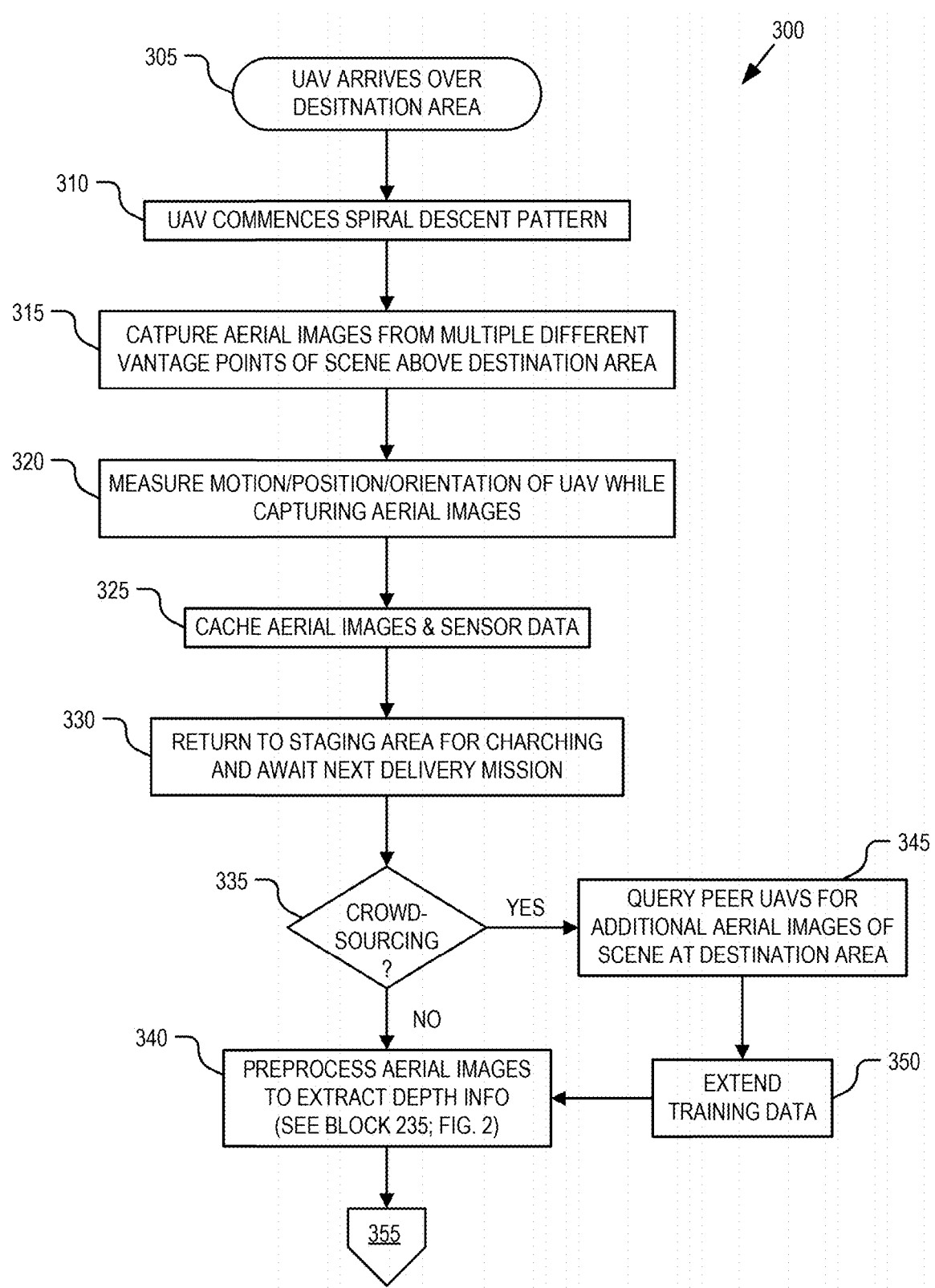
FIGS. 3A and 3B include a flow chart illustrating a method of operation of a UAV delivery system for training, communicating, and using a generative neural network (GNN) that encodes a volumetric representation of a scene at a destination area, in accordance with an embodiment of the disclosure.
Figure 3B:
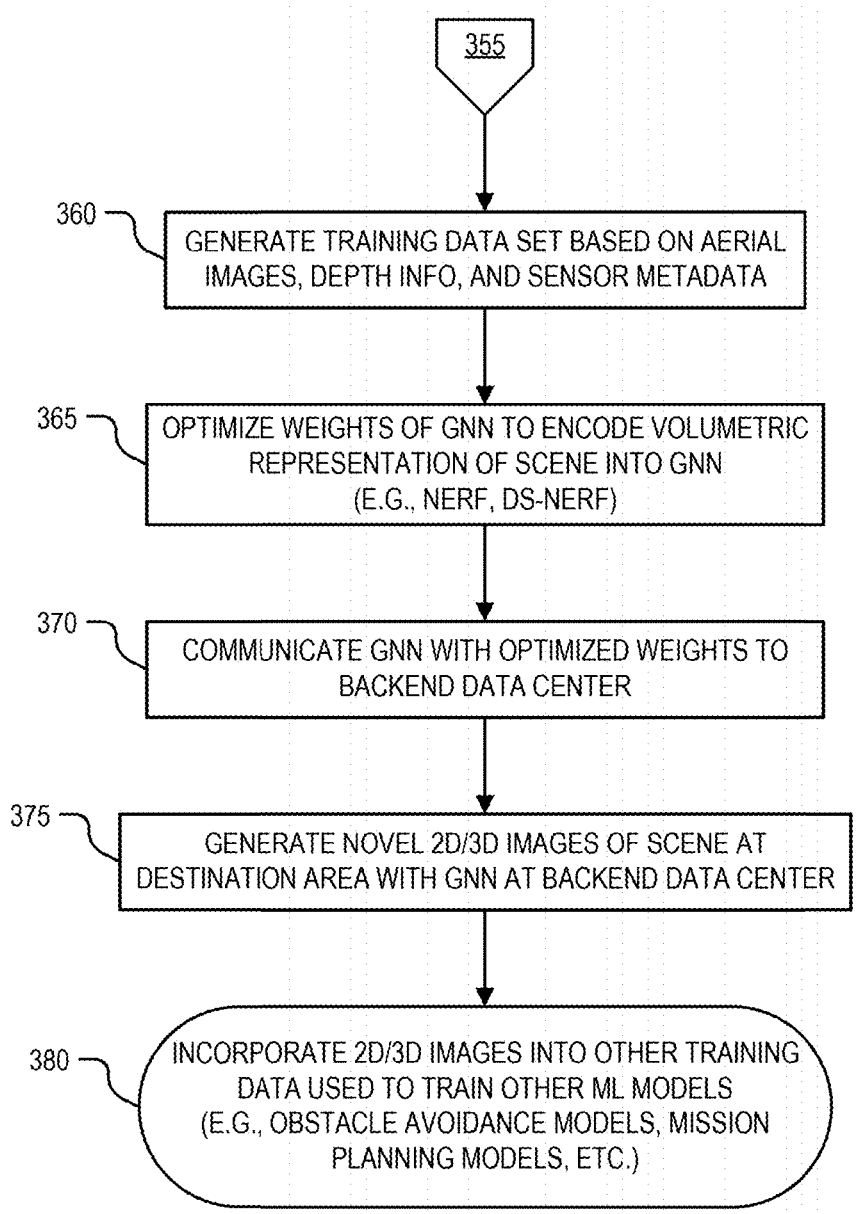

FIGS. 3A and 3B are a flow chart illustrating a process 300 of operation of a UAV delivery system for training, communicating, and using GNN 205 to encode a volumetric representation of a scene at a destination area 115, in accordance with an embodiment of the disclosure. The order in which some or all of the process blocks appear in process 300 should not be deemed limiting. Rather, one of ordinary skill in the art having the benefit of the present disclosure will understand that some of the process blocks may be executed in a variety of orders not illustrated, or even in parallel.

Figure 5:
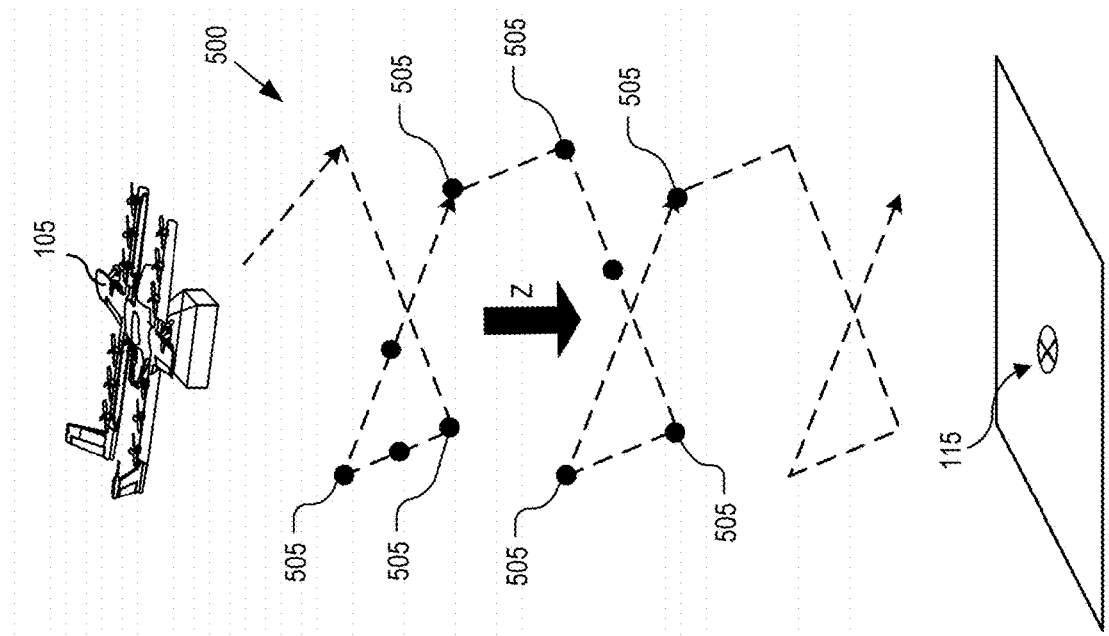
FIG. 5 illustrates a square spiral descent pattern for acquiring a distributed spatial sampling of a scene by a UAV, in accordance with an embodiment of the disclosure.
Figure 4:
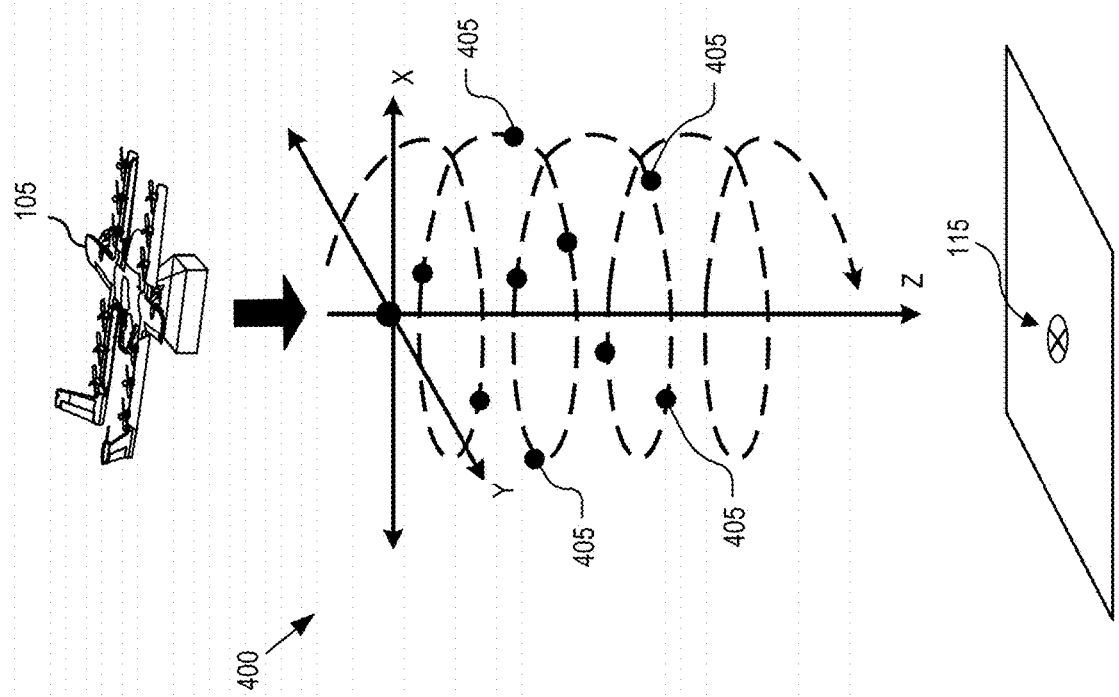
FIG. 4 illustrates a spiral descent pattern for acquiring a distributed spatial sampling of a scene by a UAV, in accordance with an embodiment of the disclosure.

In a process block 305, UAV 105 arrives over destination area 115 and commences a descent pattern towards the delivery zone (process block 310) while capturing aerial images 201. The descent may including performing various types of spiral descents to acquire aerial images 201 of the scene at destination area 115 from a variety of different UAV vantage points. The UAV vantage points are offset from each other to acquire a distributed spatial sampling of the scene. FIGS. 4 and 5 illustrate various non-limiting types of descent patterns, which could be executed to acquire the distributed spatial sampling of the scene at destination area 115. FIG. 4 illustrates a spiral descent pattern 400 where nodes 405 represent example UAV vantage points from which aerial images 201 are acquired. Spiral descent pattern 400 is a smooth circular or elliptical spiral. FIG. 5 illustrates a square spiral descent pattern 500 where nodes 505 also represent UAV vantage points from which aerial images 201 may be acquired. Spiral descent patterns 400 and 500 may be executed while delivering a package to destination area 115.

While capturing aerial images 201, the motion, position, and/or orientation of UAV 105 may be measured and recorded along with the corresponding aerial images 201 (process block 320). Sensor data 220 output from onboard sensors (e.g., GNSS sensor, IMU sensor, etc.) may be saved as sensor metadata indicative of the motion, position, or orientation of UAV 105 and associated with each corresponding aerial image 201 to generate training dataset 215. For example, the sensor metadata may be used to record the position and orientation of the onboard camera system when acquiring each aerial image 201 from the various UAV vantage points 405 or 505. An example number of distinct UAV vantage points 405/505 may include 20 vantage points, though more or less may be implemented in practice. Additionally, camera intrinsics 225 (e.g., focal length, zoom, exposure, frame rate, etc.) may also be recorded and indexed with each aerial image 201 and thereby included into training dataset 215, or referenced during image preprocessing to generate training dataset 215. Aerial images 201 may be captured as part of a package delivery mission to destination area 115, or part of a dedicated reconnaissance mission to gather images for building or updating a 3D model of destination area 115 and inform or train obstacle avoidance models, navigation models, mission planning models, etc.

After acquiring aerial images 201 along with sensor data 220 and camera intrinsics 225, the image and sensor data is cached in onboard memory of UAV 105 (process block 325) for the return journey back to terminal area 100 from which UAV 105 stages its aerial missions (process block 330). While UAV 105 recharges its batteries at terminal area 100 and awaits its next delivery mission, the otherwise idle compute resources onboard UAV 115 may be put to productive use compressing aerial images 201 into the weights and biases of GNN 205. Leveraging the onboard compute resources to compress the multiple aerial images 201 into the weights of GNN 205 trades off the productive use of an otherwise idle resource to save scarce bandwidth over network 207 linking UAVs 105 to backend datacenter 210. For example, each 2D aerial image 201 may be a five megabyte image while the trained GNN 205, which encodes a complete 3D volumetric representation of the scene, may itself only occupy 5 megabytes. Not only is bandwidth across network 207 saved, but memory and compute resources at backend datacenter 210 are also freed. The fleet of UAVs 105 charging at terminal area 100 awaiting their next mission otherwise represent idle compute resources.

In some embodiments, UAVs 105 are capable of crowdsourcing additional aerial images of destination area 115 from peer UAVs 105 (decision block 335). Crowdsourcing is defined herein to include a fully automated (e.g., self-supervised without human intervention) collection of data from peer UAVs. Peer UAVs 105 may be caching additional aerial images of the scene at destination area 115 from other missions flown over or near destination area 115. In such embodiments, prior to commencement of preprocessing 235 and training of GNN 205, peer UAVs 105 at terminal area 100 are queried for such additional aerial images (process block 345). If any peer UAVs 105 are caching additional aerial images, then those images along with any associated sensor metadata are added to training dataset 215 (process block 350). In this manner additional images from additional UAV vantage points may be used to improve the training of GNN 205 and thus the volumetric representation encoded into GNN 205.

Whether or not crowdsourcing of additional images is available (decision block 335), aerial images 201 gathered by UAV 105 and currently cached onboard from the earlier mission (e.g., delivery mission) are preprocessed at process block 340 (see also block 235 in FIG. 2). Preprocessing is executed to extract depth information 230 from the aerial images 201 themselves for depth supervised optimization of the weights (and biases) of GNN 205. The depth information 230 may be generated using stereo depth information, optical flow analysis, structure from motion (SfM) processing, or otherwise. If UAV 105 includes an onboard light detection and ranging (LIDAR) sensor, then a LIDAR map may also be captured and analyzed to extract depth information, which may then be correlated to image pixels in aerial images 201 for DS optimization (e.g., DS-NeRF).

Continuing to FIG. 3B (see off-page references 355), training dataset 215 is generated at process block 360 using scene information captured in aerial images 201, sensor data 220, and camera intrinsics 225. Training dataset 215 is the ground truth data used to optimize the weights (and biases) of GNN 205. Training dataset 215 may include the sparse scene views from aerial images 201, additional aerial images from peer UAVs 105 (if available), depth information 230, along with sensor data 220 and/or camera intrinsics 225. In one embodiment, only aerial images 201 along with sensor data 220 indicative of the location (e.g., GPS location, visual localization, etc.) and orientation (e.g., yaw, pitch, and/or roll) of UAV 105 when capturing each aerial image 201 are used to generate training dataset 215. In other embodiments, preprocessing 235 is used to generate additional location information (e.g., visual localization based upon the aerial images themselves) and depth information 230. In yet other embodiments, other available sensor data 220, camera intrinsics 225, or other available data are combined to provide a more complete training dataset 215, which can not only result in a higher quality volumetric representation of the scene, but also expedite the optimization/training of GNN 205.

Once training dataset 215 is gathered, preprocessed, and otherwise prepared, then the iterative training of GNN 205 to encode the volumetric representation can commence (process block 365). In one embodiment, a NeRF optimization is performed whereby training dataset 215 is used to optimizes an underlying continuous volumetric scene function $F_\theta$ using the sparse set of input views (aerial images 201). GNN 205 may implement an MLP network Fe as a fully connected deep neural network. The input to GNN 205 may be a five-dimension (5D) coordinate (x, y, z, θ, φ) consisting of three positional coordinates (x, y, z) and two viewing directions (θ, φ). The output of GNN 205 is a volume density σ and directional emitted color c which may be represented as RGB values. Thus, in one embodiment, GNN 205 is an MLP network Fe whose weights Θ map the 5D coordinates (x, y, z, θ, Φ) to (c, σ), which can then be integrated along viewing directions to recreate novel views of the scene. The 5D neural radiance field represents the scene at destination area 115 as the volume density and directional emitted radiance at any point in space. The loss function used to train weights Θ may be constructed using a summed difference between a given aerial image 201 and a corresponding scene view reconstructed by $F_\theta$. An iterative gradient descent is performed using the training dataset 215, including its various aerial images 201, to minimize a loss value output from the loss function thereby compressing aerial images 201 into the weights Θ of GNN 205. In an embodiment that uses a depth-supervised optimization, then depth information 230 is included in training dataset 215 to expedite convergence of the loss function during the iterative gradient descents.

With GNN 205 trained onboard UAV 105, training dataset 215 along with aerial images 201 may be deleted to recycle onboard memory of UAV 105 while GNN 205 in the form of its optimized weights (and biases) Θ may be communicated to backend datacenter 210 over network 207 (process block 370), thereby greatly saving bandwidth in network 207 and memory/compute resources in backend datacenter 210 while productively leveraging otherwise idle compute resources within UAV 105. In situations where UAV 105 does not have broadband internet access (e.g., WiFi), the high compression provided by GNN 205 can significantly reduce the cost of sending the image data to backend datacenter 210.

In a process block 375, the trained GNN 205 may be used by backend datacenter 210 to generate 2D or 3D reconstructed images 212 of the scene at destination area 115. The 2D reconstructed images 212 may be the same as aerial images 201 or entirely new views. In the 3D context, GNN 205 may be used to generate a dense point cloud, dense surfaces with meshing, or otherwise. Since GNN 205 encodes a volumetric representation of the scene at destination area 115, reconstructed images 212 may be novel views of the scene from vantage points not captured by aerial images 201. In a process block 380, the reconstructed images 212 may be used by backend datacenter 210 for a variety of purposes. For example, reconstructed images 212 may be used to generate photorealistic training data for training other ML models 214 used by the UAV delivery system. Other ML models 214 used by the UAV delivery system may include obstacle avoidance models, mission planning models, navigation models, etc. In yet other embodiments, GNN 205 itself (or images output from GNN 205) may be incorporated into future mission data 216 for delivery missions returning to the same location. If the mission planning model knows the approach route for the delivery mission, then the mission data may include preselected views of the scene at destination area 115 corresponding to the approach angle/route so that the future UAV has photo realistic reference images from relevant UAV vantage points. These photo realistic reference images can be used as references for high accuracy visual navigation and localization at destination area 115.

In one embodiment, UAVs 105 may train multiple GNNs 205 of a single destination area 115 over the course of multiple delivery missions to destination area 115. These GNNs 205 may be trained on aerial images acquired during the presence of a plurality of different environment conditions. For example, GNNs 205 can be trained for sunny conditions, overcast conditions, in the presence of snow, during rainy conditions, during different seasons and times of day when lighting conditions are variable. Collecting aerial images during variable environmental conditions and training GNNs during these distinct environmental conditions can broaden the training data used for training other ML models and/or provide greater reference images for visual navigation to a given location.

Figure 6A:
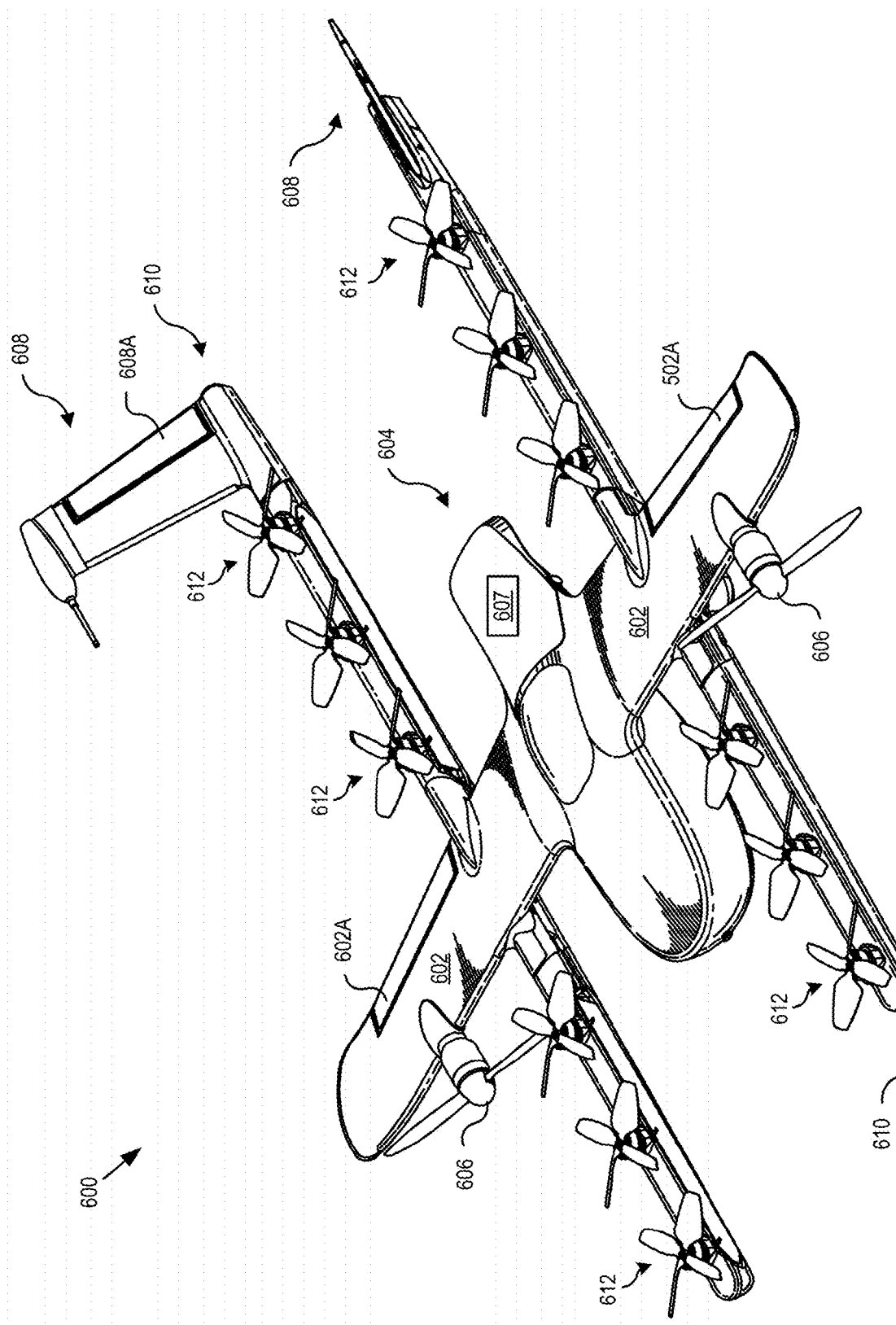
FIG. 6A is a perspective view illustration of a UAV configured for use in a UAV delivery system, in accordance with an embodiment of the disclosure.
Figure 6B:
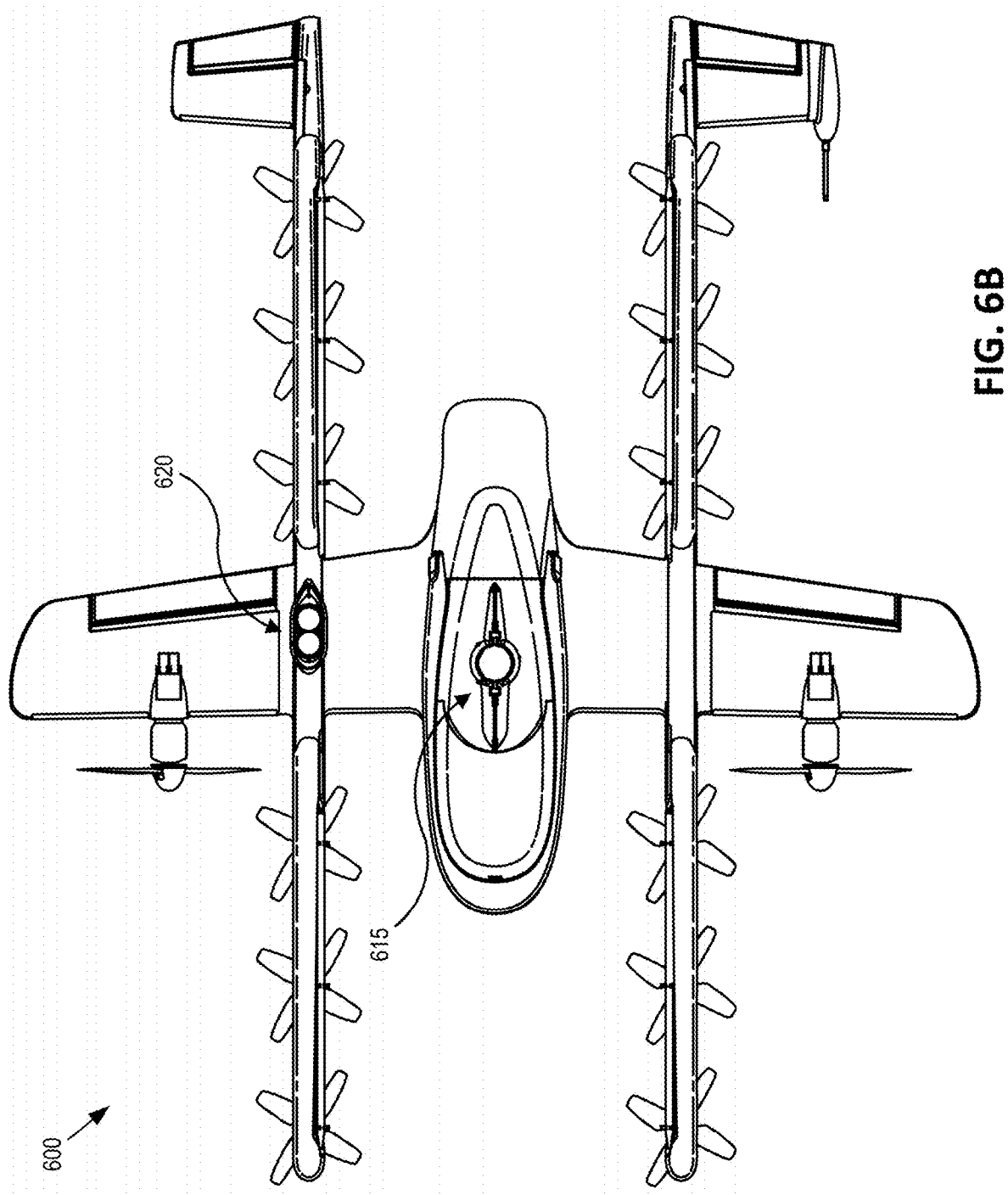
FIG. 6B is an underside plan view illustration of the UAV configured for use in the UAV delivery system, in accordance with an embodiment of the disclosure.

FIGS. 6A and 6B illustrate an example UAV 600 that is well suited for delivery of packages, in accordance with an embodiment of the disclosure. FIG. 6A is a topside perspective view illustration of UAV 600 while FIG. 6B is a bottom side plan view illustration of the same. UAV 600 is one possible implementation of UAVs 105 illustrated in FIG. 1, although other types of UAVs may be implemented as well.

The illustrated embodiment of UAV 600 is a vertical takeoff and landing (VTOL) UAV that includes separate propulsion units 606 and 612 for providing horizontal and vertical propulsion, respectively. UAV 600 is a fixed-wing aerial vehicle, which as the name implies, has a wing assembly 602 that can generate lift based on the wing shape and the vehicle's forward airspeed when propelled horizontally by propulsion units 606. The illustrated embodiment of UAV 600 has an airframe that includes a fuselage 604 and wing assembly 602. In one embodiment, fuselage 604 is modular and includes a battery module, an avionics module, and a mission payload module. These modules are secured together to form the fuselage or main body.

The battery module (e.g., fore portion of fuselage 604) includes a cavity for housing one or more batteries for powering UAV 600. The avionics module (e.g., aft portion of fuselage 604) houses flight control circuitry of UAV 600, which may include a processor and memory, communication electronics and antennas (e.g., cellular transceiver, wifi transceiver, etc.), and various sensors (e.g., global navigation satellite system (GNSS) sensors, an inertial measurement unit (IMU), a magnetic compass, a radio frequency identifier reader, etc.). Collectively, these functional electronic subsystems for controlling UAV 600, communicating, and sensing the environment may be referred to as an onboard control system 607. The mission payload module (e.g., middle portion of fuselage 604) houses equipment associated with a mission of UAV 600. For example, the mission payload module may include a payload actuator 615 (see FIG. 6B) for dispensing and recoiling a line when picking up a package during a package delivery mission. In some embodiments, the mission payload module may include camera/sensor equipment (e.g., camera, lenses, radar, lidar, pollution monitoring sensors, weather monitoring sensors, scanners, etc.). In FIG. 6B, an onboard camera system 620 is mounted to the underside of UAV 600 to support a machine vision system (e.g., monovision frame camera, stereoscopic machine vision, event camera, lidar depth camera, etc.) for visual triangulation, localization, and navigation as well as operate as an optical code scanner for reading visual codes affixed to packages. These visual codes may be associated with or otherwise match to delivery missions and provide the UAV with a handle for accessing destination, delivery, and package validation information. Onboard camera 620 may be used to acquire aerial images 201.

As illustrated, UAV 600 includes horizontal propulsion units 606 positioned on wing assembly 602 for propelling UAV 600 horizontally. UAV 600 further includes two boom assemblies 610 that secure to wing assembly 602. Vertical propulsion units 612 are mounted to boom assemblies 610. Vertical propulsion units 612 providing vertical propulsion. Vertical propulsion units 612 may be used during a hover mode where UAV 600 is descending (e.g., to a delivery location), ascending (e.g., at initial launch or following a delivery), or maintaining a constant altitude. Stabilizers 608 (or tails) may be included with UAV 600 to control pitch and stabilize the aerial vehicle's yaw (left or right turns) during cruise. In some embodiments, during cruise mode vertical propulsion units 612 are disabled or powered low and during hover mode horizontal propulsion units 606 are disabled or powered low.

During flight, UAV 600 may control the direction and/or speed of its movement by controlling its pitch, roll, yaw, and/or altitude. Thrust from horizontal propulsion units 606 is used to control air speed. For example, the stabilizers 608 may include one or more rudders 608A for controlling the aerial vehicle's yaw, and wing assembly 602 may include elevators for controlling the aerial vehicle's pitch and/or ailerons 602A for controlling the aerial vehicle's roll. While the techniques described herein are particularly well-suited for VTOLs providing an aerial delivery service, it should be appreciated that embodiments are not thus limited.

Many variations on the illustrated fixed-wing aerial vehicle are possible. For instance, aerial vehicles with more wings (e.g., an "x-wing" configuration with four wings), are also possible. Although FIGS. 6A and 6B illustrate one wing assembly 602, two boom assemblies 610, two horizontal propulsion units 606, and six vertical propulsion units 612 per boom assembly 610, it should be appreciated that other variants of UAV 600 may be implemented with more or less of these components.

It should be understood that references herein to an "unmanned" aerial vehicle or UAV can apply equally to autonomous and semi-autonomous aerial vehicles. In a fully autonomous implementation, all functionality of the aerial vehicle is automated; e.g., pre-programmed or controlled via real-time computer functionality that responds to input from various sensors and/or pre-determined information. In a semi-autonomous implementation, some functions of an aerial vehicle may be controlled by a human operator, while other functions are carried out autonomously. Further, in some embodiments, a UAV may be configured to allow a remote operator to take over functions that can otherwise be controlled autonomously by the UAV. Yet further, a given type of function may be controlled remotely at one level of abstraction and performed autonomously at another level of abstraction. For example, a remote operator may control high level navigation decisions for a UAV, such as specifying that the UAV should travel from one location to another (e.g., from a warehouse in a suburban area to a delivery address in a nearby city), while the UAV's navigation system autonomously controls more fine-grained navigation decisions, such as the specific route to take between the two locations, specific flight controls to achieve the route and avoid obstacles while navigating the route, and so on.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible machine-readable storage medium includes any mechanism that provides (i.e., stores) information in a non-transitory form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A method performed by an unmanned aerial vehicle (UAV) delivery system, the method comprising:
   arriving by a UAV of the UAV delivery system over a destination area;
   capturing a plurality of aerial images of a scene at the destination area with an onboard camera system of the UAV while flying above the destination area, wherein the aerial images capture the scene from a plurality of UAV vantage points offset from each other above the destination area;
   optimizing weights of a generative neural network (GNN) using at least some of the aerial images as a training dataset to encode a volumetric representation of the scene into the GNN, wherein the weights are optimized by an onboard processing system of the UAV and after the optimizing the GNN is queryable to generate novel views of the scene from novel vantage points different than the UAV vantage points; and
   communicating the GNN with the weights optimized to a backend datacenter in communication with the UAV to transmit the volumetric representation of the scene over which the UAV flew without transmitting the aerial images themselves to the backend datacenter.

2. The method of claim 1, further comprising:
   measuring a motion, a position, or an orientation of the UAV with one or more onboard sensors of the UAV when capturing the aerial images;
   associating sensor metadata indicative of the motion, the position, or the orientation of the UAV when capturing the aerial images with corresponding ones of the aerial images; and
   incorporating the sensor metadata into the training data set used to optimize the weights of the GNN.

3. The method of claim 2, wherein the sensor metadata includes at least one of inertial measurement unit (IMU) sensor data or global navigation satellite system (GNSS) sensor data.

4. The method of claim 1, further comprising:
   performing a spiral descent pattern with the UAV over the destination area while capturing the aerial images to acquire a distributed spatial sampling of the scene while descending to the destination area.

5. The method of claim 1, further comprising:
   preprocessing the aerial images to extract depth information from the aerial images; and
   incorporating the depth information into the training dataset to facilitate a depth-supervised optimization of the weights of the GNN.

6. The method of claim 5, wherein the onboard camera system comprises a stereovision camera system and wherein preprocessing the aerial images comprises:
   extracting stereo depth information from stereo images of the aerial images to extract the depth information.

7. The method of claim 5, wherein preprocessing the aerial image comprises:

performing an optical flow analysis on at least some of the aerial images to extract the depth information.

8. The method of claim 5, wherein optimizing the weights of the GNN comprises performing a depth-supervised neural radiance field (NeRF) optimization.

9. The method of claim 1, further comprising:
caching the aerial images acquired at the destination area onboard the UAV until returning the UAV to a staging area of the UAV after performing a delivery mission to the destination area by the UAV; and
performing the optimizing of the weights of the GNN onboard the UAV after the UAV has returned to the staging area and while the UAV is charging for a next delivery mission.

10. The method of claim 9, further comprising:
crowdsourcing additional aerial images of the destination area by the UAV from peer UAVs that are caching the additional aerial images from other delivery missions flown over or near the destination area; and
extending the training dataset by the UAV with the crowdsourced additional aerial images acquired from the peer UAVs.

11. The method of claim 1, further comprising:
generating a two-dimensional (2D) image, a three-dimensional (3D) image, or a 3D reconstruction of the scene at the destination area with the GNN that encodes the volumetric representation of the scene; and
incorporating the 2D image, the 3D image, or the 3D reconstruction into other training data used to train other machine learning models of the UAV delivery system.

12. The method of claim 1, further comprising:
training a plurality of GNNs across a plurality of delivery missions to the destination area during a plurality of different environmental conditions; and
using the plurality of trained GNNs to improve automated decision making by the aerial delivery system when delivering to the destination area across a variety of environmental conditions.

13. At least one non-transitory machine-accessible storage medium storing instructions that, when executed by a unmanned aerial vehicle (UAV) delivery system, will cause the UAV delivery system to perform operations comprising:
arriving by a UAV of the UAV delivery system over a destination area;
capturing a plurality of aerial images of a scene at the destination area with an onboard camera system of the UAV while flying above the destination area, wherein the aerial images capture the scene from a plurality of UAV vantage points offset from each other above the destination area;
compressing scene information from the aerial images into a generative neural network (GNN) by optimizing weights of the GNN using at least some of the aerial images as a training dataset to encode a volumetric representation of the scene into the GNN, wherein the weights are optimized by an onboard processing system of the UAV and after the optimizing the GNN is queryable to generate novel views of the scene from novel vantage points different than the UAV vantage points; and
communicating the GNN with the weights optimized to a backend datacenter in communication with the UAV to transmit the volumetric representation of the scene over which the UAV flew without transmitting the aerial images themselves to the backend datacenter, wherein the GNN with the weights optimized has a reduced data size relative to the aerial images used during training of the GNN.

14. The at least one non-transitory machine-accessible storage medium of claim 13, the operations further comprising:
measuring a motion, a position, or an orientation of the UAV with one or more onboard sensors of the UAV when capturing the aerial images;
associating sensor metadata indicative of the motion, the position, or the orientation of the UAV when capturing the aerial images with corresponding ones of the aerial images; and
incorporating the sensor metadata into the training data set used to optimize the weights of the GNN.

15. The at least one non-transitory machine-accessible storage medium of claim 14, wherein the sensor metadata includes at least one of inertial measurement unit (IMU) sensor data or global navigation satellite system (GNSS) sensor data.

16. The at least one non-transitory machine-accessible storage medium of claim 13, the operations further comprising:
performing a spiral descent pattern with the UAV over the destination area while capturing the aerial images to acquire a distributed spatial sampling of the scene while descending to the destination area.

17. The at least one non-transitory machine-accessible storage medium of claim 13, the operations further comprising:
preprocessing the aerial images to extract depth information from the aerial images; and
incorporating the depth information into the training dataset to facilitate a depth-supervised optimization of the weights of the GNN.

18. The at least one non-transitory machine-accessible storage medium of claim 17, wherein the onboard camera system comprises a stereovision camera system and wherein preprocessing the aerial images comprises:
extracting stereo depth information from stereo images of the aerial images to extract the depth information.

19. The at least one non-transitory machine-accessible storage medium of claim 17, wherein preprocessing the aerial image comprises:
performing an optical flow analysis on at least some of the aerial images to extract the depth information.

20. The at least one non-transitory machine-accessible storage medium of claim 17, wherein optimizing the weights of the GNN comprises performing a depth-supervised neural radiance field (NeRF) optimization.

21. The at least one non-transitory machine-accessible storage medium of claim 13, the operations further comprising:
caching the aerial images acquired at the destination area onboard the UAV until returning to a staging area of the UAV after performing a delivery mission to the destination area by the UAV; and
performing the optimizing of the weights of the GNN onboard the UAV after the UAV has returned to the staging area and while the UAV is charging for a next delivery mission.

22. The at least one non-transitory machine-accessible storage medium of claim 21, the operations further comprising:
crowdsourcing additional aerial images of the destination area by the UAV from peer UAVs that are caching the additional aerial images from other delivery missions flown over or near the destination area; and extending the training dataset by the UAV with the crowdsourced additional aerial images acquired from the peer UAVs.

23. The at least one non-transitory machine-accessible storage medium of claim 13, the operations further comprising:

generating a two-dimensional (2D) image or a three-dimensional (3D) image, or a 3D reconstruction of the scene at the destination area with the GNN that encodes the volumetric representation of the scene; and incorporating the 2D image, the 3D image, or the 3D reconstruction into other training data used to train other machine learning models of the UAV delivery system.

24. The at least one non-transitory machine-accessible storage medium of claim 13, the operations further comprising:

training a plurality of GNNs across a plurality of delivery missions to the destination area during a plurality of different environmental conditions; and using the plurality of trained GNNs to improve automated decision making by the aerial delivery system when delivering to the destination area across a variety of environmental conditions.

* * * * *